(12) United States Patent
Yip et al.

(10) Patent No.: US 9,247,616 B2
(45) Date of Patent: Jan. 26, 2016

(54) METHOD AND APPARATUS FOR ILLUMINATING

(75) Inventors: Kun-Wah Yip, Hong Kong (HK); Di Lou, Shanghai (CN); Lucius Theodorus Vinkenvleugel, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 383 days.

(21) Appl. No.: 13/808,789

(22) PCT Filed: Jun. 20, 2011

(86) PCT No.: PCT/IB2011/052670
§ 371 (c)(1),
(2), (4) Date: Jan. 7, 2013

(87) PCT Pub. No.: WO2012/004696
PCT Pub. Date: Jan. 12, 2012

(65) Prior Publication Data
US 2013/0106309 A1 May 2, 2013

(30) Foreign Application Priority Data

Jul. 6, 2010 (WO) .............. PCT/CN2010/075014

(51) Int. Cl.
*H05B 37/02* (2006.01)
*H05B 39/04* (2006.01)

(52) U.S. Cl.
CPC .............. *H05B 37/02* (2013.01); *H05B 37/029* (2013.01); *H05B 37/0218* (2013.01);
(Continued)

(58) Field of Classification Search
CPC ........... G02B 2027/0118; G01J 1/4204; G01J 1/4228

USPC ................. 315/76, 149, 151, 152, 153, 297
See application file for complete search history.

(56) References Cited

U.S. PATENT DOCUMENTS 3,814,852 A * 6/1974 Mierzwinski ................. 348/602
4,631,675 A 12/1986 Jacobsen et al.
(Continued)

FOREIGN PATENT DOCUMENTS

EP 0603936 A1 6/1994
EP 0993237 A2 4/2000
(Continued)

*Primary Examiner* — William Hernandez
(74) *Attorney, Agent, or Firm* — Meenakshy Chakravorty

(57) ABSTRACT

This invention provides an illumination apparatus and an illumination method. The illumination apparatus comprises: a first light source for illuminating a first area; a second light source for illuminating a second area; a first measuring unit for measuring the illuminance of the first area; a second measuring unit for measuring the illuminance of the second area; and an adjusting unit for adjusting at least one of the first light source and the second light source to make the contrast ratio of the measured illuminance of the first area to the measured illuminance of the second area change gradually from a first predefined value to a second predefined value lower than the first predefined value during a first predefined duration. In this way, the relative higher contrast ratio (i.e. the first predefined value) enables the users to improve their work efficiency and the relative lower contrast ratio (i.e. the second predefined value) allows the users' eyes to be comfortable. In addition, because the contrast ratio changes gradually, the users' attention will not be distracted and the users' eyes will remain comfortable when the contrast ratio changes.

15 Claims, 6 Drawing Sheets

(52) U.S. Cl.
CPC ........... *H05B 37/0281* (2013.01); *H05B 39/04* (2013.01); *H05B 39/042* (2013.01); *Y02B 20/42* (2013.01); *Y02B 20/46* (2013.01)

(56) References Cited

U.S. PATENT DOCUMENTS

| | | | |
|---|---|---|---|
| 5,254,909 A | 10/1993 | Shyu et al. | |
| 2004/0105264 A1* | 6/2004 | Spero | 362/276 |
| 2006/0244717 A1 | 11/2006 | Ohlson | |
| 2007/0258243 A1 | 11/2007 | Segall | |
| 2009/0072945 A1 | 3/2009 | Pan et al. | |
| 2009/0085485 A1* | 4/2009 | Young | 315/155 |
| 2014/0132578 A1* | 5/2014 | Zheng | 345/207 |
| 2014/0368112 A1* | 12/2014 | Adachi et al. | 315/76 |
| 2015/0002029 A1* | 1/2015 | Ide | 315/155 |

FOREIGN PATENT DOCUMENTS

| | | |
|---|---|---|
| EP | 1821582 A1 | 8/2007 |
| EP | 1959320 A1 | 8/2008 |
| GB | 2187902 A | 9/1987 |
| JP | 10247591 A | 9/1998 |
| JP | 11162658 A | 6/1999 |
| JP | 11283754 A | 10/1999 |
| WO | 2008090494 A1 | 7/2008 |
| WO | 2009081329 A1 | 7/2009 |
| WO | 2009090596 A1 | 7/2009 |

* cited by examiner

METHOD AND APPARATUS FOR ILLUMINATING

FIELD OF THE INVENTION

The invention relates to luminaires, more particularly, to luminaires capable of adjusting the generated light intensity.

BACKGROUND OF THE INVENTION

It is known that the illumination requirement is dependent on the visual qualities of the subject being illuminated and appropriate lighting can enhance human experience and make the task at hand easier to perform. For example, bright light is better for reading, soft warm light is better for resting, etc.

In the area of desk lighting, some of the relevant literature recommends a task-area-to-background contrast ratio of 10:3 for providing eye protection and eye comfort. However, this recommended "comfortable" contrast ratio does not consider the need to improve the working efficiency of desk lamp users.

US2007/0258243A1 provides a lighting system for delivering dynamic, fully customized and automatic illumination to a subject. The provided lighting system can adjust the pattern and spectra of light generated by a light source, on the basis of detection information on a target area detected by a sensor pad. However, US2007/0258243A1 fails to point out the relation between work efficiency and comfort of a user's eyes, and therefore fails to give the solution of adjusting the illumination with a view to working efficiency and eye comfort.

There is a need to provide a luminaire, taking into consideration both the requirements of improving working efficiency and maintaining eye comfort.

SUMMARY OF THE INVENTION

The inventors of the present invention have found that some lighting conditions helpful for improving a user's working efficiency may not be in line with the recommended lighting conditions. The inventors have further found that humans can maintain a good working efficiency under these "high working efficiency" lighting conditions for a considerable period of time. Within this period of time, the user does not have a significant "uncomfortable feeling" with respect to his/her eyes, and this feeling does not significantly change, for example, the level of eyestrain remains within a normal value. However, if the user continues to work under lighting conditions which are not in line with the recommended "comfortable" lighting conditions for more than an appropriate period of time, the degree to which the "uncomfortable feeling" is felt by the eyes increases greatly, for example, the degree of eyestrain increases greatly. The inventors further have found that, if the illumination changes gradually from a "high working efficiency" lighting condition to a "comfortable" lighting condition, users can have both the benefits of a high working efficiency and a comfortable feeling of the eyes.

Based on these findings, it would be advantageous to provide an illumination solution which can improve the working efficiency of the users. And it would also be desirable for the illumination solution to balance the eye characteristics of the user and the working efficiency of the user.

According to an embodiment of the present invention, an illumination apparatus is provided. The illumination apparatus comprises:

a first light source for illuminating a first area;
a second light source for illuminating a second area;
a first measuring unit for measuring the illuminance of the first area;
a second measuring unit for measuring the illuminance of the second area; and
an adjusting unit for adjusting at least one of the first light source and the second light source to make the contrast ratio of the measured illuminance of the first area to the measured illuminance of the second area change gradually from a first predefined value to a second predefined value lower than the first predefined value during a first predefined duration.

The basic idea is to adjust the contrast ratio gradually from the first predefined value to the second predefined value by adjusting at least one of the first light source and the second light source. In this way, when the first area is a task area and the second area is a background area, the relative higher contrast ratio (i.e. the first predefined value) enables the users to improve their work efficiency and the relative lower contrast ratio (i.e. the second predefined value) enables the users' eyes to be comfortable. In addition, because the contrast ratio changes gradually, the users will not notice, at least not be disturbed by, the change of the contrast ratio. Therefore, the users' attention will not be distracted and the users' eyes can keep feeling comfortable when the contrast ratio is changed.

According to an embodiment of another aspect of the present invention, a method of illuminating is provided. The method comprises the steps of:
illuminating a first area by a first light source;
illuminating a second area by a second light source;
measuring the illuminance of the first area;
measuring the illuminance of the second area; and
adjusting at least one of the first light source and the second light source to make the contrast ratio of the measured illuminance of the first area to the measured illuminance of the second area change gradually from a first predefined value to a second predefined value lower than the first predefined value during a first predefined duration.

These and other aspects of the invention will be apparent from and elucidated with reference to the embodiments described hereinafter.

DESCRIPTION OF THE DRAWINGS

The above and other objects and features of the present invention will become more apparent from the following detailed description considered in connection with the accompanying drawings, in which.

The same reference numerals are used to denote similar parts throughout the Figures.

DETAILED DESCRIPTION

A detailed description of the present invention is given below in connection with the accompanying drawings.

Figure 1:
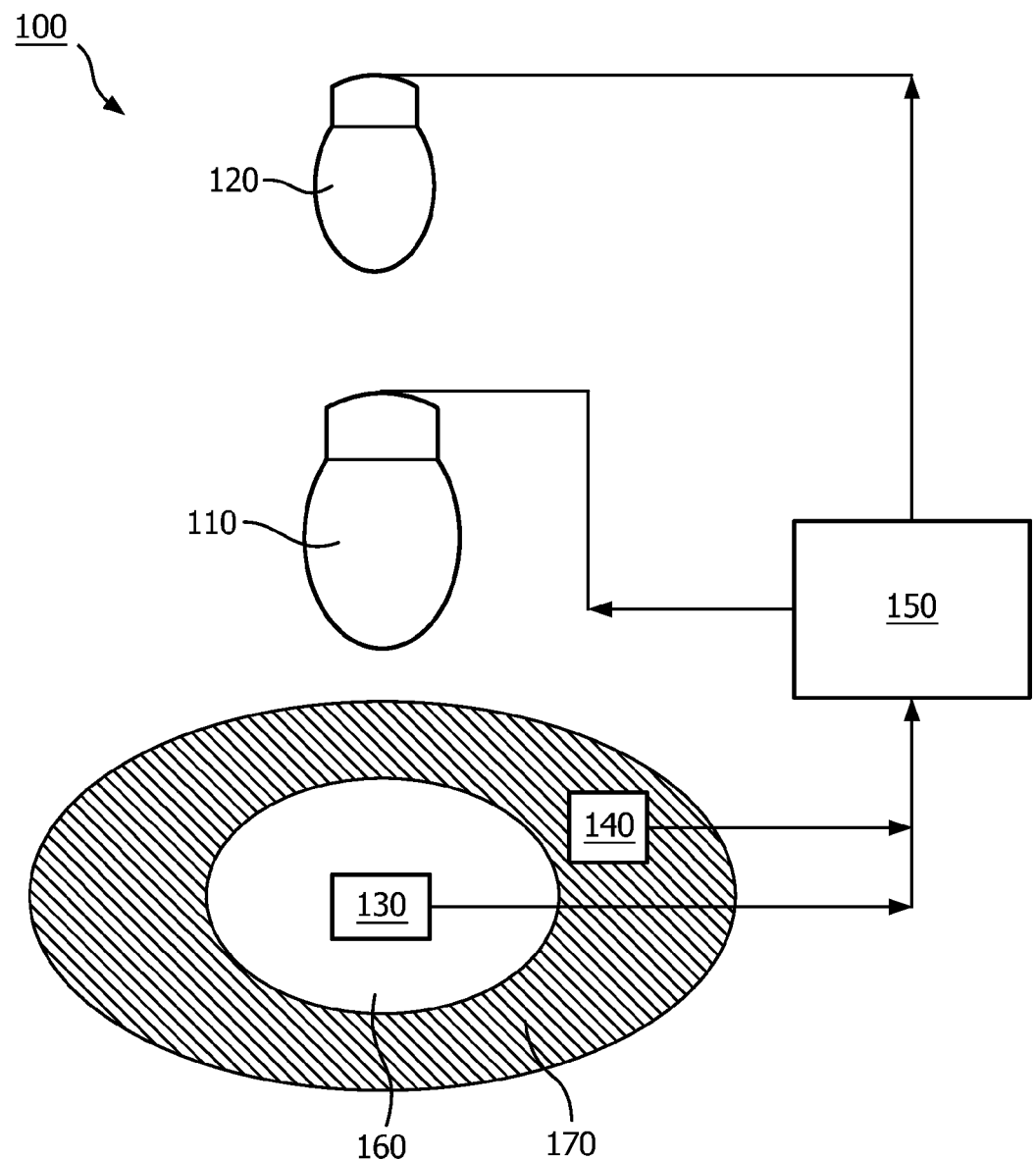
FIG. 1 depicts a schematic diagram of an illumination apparatus in accordance with an embodiment of the present invention.

As shown in FIG. 1, the illumination apparatus 100 comprises a first light source 110, a second light source 120, a first measuring unit 130, a second measuring unit 140 and an adjusting unit 150.

The first light source 110 is configured to illuminate a first area 160, and the second light source 120 is configured to illuminate a second area 170. The first light source 110 and the second light source 120 can be implemented in many ways, such as fluorescent lamps, light emitting diodes, halogen lamps, incandescent lamps or organic light-emitting materials.

The first area and the second area can be determined in many ways. For example, the first area is a task area where a task (e.g. reading a book or drawing a picture) is performed and the object of the task (e.g. the book or the picture) is placed in the task area; and the second area is a background area surrounding the first area or next to the first area.

The first area 160 is mainly illuminated by the first light source 110 and it is also possible that part of the first area 160 can receive part of the light emitted by the second light source 120. Similarly, the second area 170 is mainly illuminated by the second light source 120 and it is also possible that part of the second area 170 can receive part of the light emitted by the first light source 110.

The first measuring unit 130 is used for measuring the illuminance of the first area 160, and the second measuring unit 140 is used for measuring the illuminance of the second area 170.

The first measuring unit 130 and the second measuring unit 140 can be implemented in many ways, such as photosensors or illuminometers. The first measuring unit can measure the illuminance of the first area in many ways. For example, several photosensors are placed in several positions of the first area and the illuminance of the first area is the average of several illuminance values obtained by the several photosensors. For another example, the first light source illuminates the first area uniformly and one photosensor is used to measure the illuminance of the first area. The second measuring unit 140 can measure the illuminance of the second area in a similar way. Since the person skilled in the art knows how to measure illuminance, it will not be elaborated on here.

The adjusting unit 150 is for adjusting at least one of the first light source 110 and the second light source 120 to make the contrast ratio of the measured illuminance of the first area to the measured illuminance of the second area change gradually from a first predefined value to a second predefined value lower than the first predefined value during a first predefined duration.

The first predefined duration can be determined in many ways. In an embodiment, the first predefined duration can be determined by the users according to their own preference, and the illumination apparatus further comprises a user interface (not shown) for receiving an input to define any one of the first predefined duration, the first predefined value, and the second predefined value. The user interface can be implemented in many ways, such as a small keyboard or a touch-screen. In another embodiment, the first predefined duration can be set as a period (e.g. less than 20 minutes) during which the users' eyes can still feel comfortable even if the contrast ratio is not the second predefined value.

The first predefined value and the second predefined value can be determined in many ways. In an embodiment, the first predefined value is 10:0, i.e. there is not any light emitted by the second light source, and the second predefined value is in the range from 10:2 to 10:4. That is to say that the illuminance of the first area remains unchanged and the illuminance of the second area changes from zero to a relative higher value. Optionally, the first predefined value can be another value close to 10:0, such as 10:0.5 or 10:1. Preferably, the second predefined value is 10:3.

The adjusting unit 150 can be implemented in many ways. For example, the adjusting unit comprises a comparing circuit (not shown) for comparing the measured illuminance with the predefined value and a dimmable circuit (not shown) for adjusting the intensity of the light emitted by the light source on the basis of the compared results. For another example, the adjusting unit comprises a comparing circuit (not shown) for comparing the measured illuminance with the predefined value and an auto-mechanism (not shown) for blocking part or all of the light emitted by the light source on the basis of the compared results.

In this way, when the first area is a task area and the second area is a background area, the relative higher contrast ratio (i.e. the first predefined value) enables the users to improve their work efficiency and the relative lower contrast ratio (i.e. the second predefined value) enables the users' eyes to be comfortable. In addition, because the contrast ratio changes gradually, the users will not notice the change of the contrast ratio. Therefore, the users' attention will not be distracted and the users' eyes can keep feeling comfortable when the contrast ratio is changed.

Optionally, the adjusting unit 150 can keep the measured illuminance of the first area unchanged during the adjustment of at least one of the first light source 110 and the second light source 120. In this way, the users' eyes will feel comfortable during the adjustment process and the work of the users will not be disturbed. Alternatively, it is also practical to keep the second light source unchanged and adjust the first light source.

The illumination apparatus can be implemented in many ways.

Figure 2A:
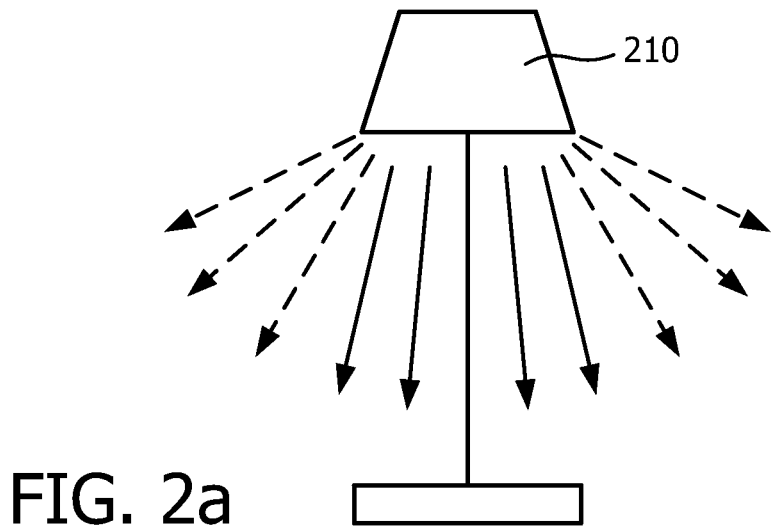
FIG. 2a and FIG. 2b depict schematic diagrams of an illumination apparatus in accordance with an embodiment of the present invention.
Figure 2B:
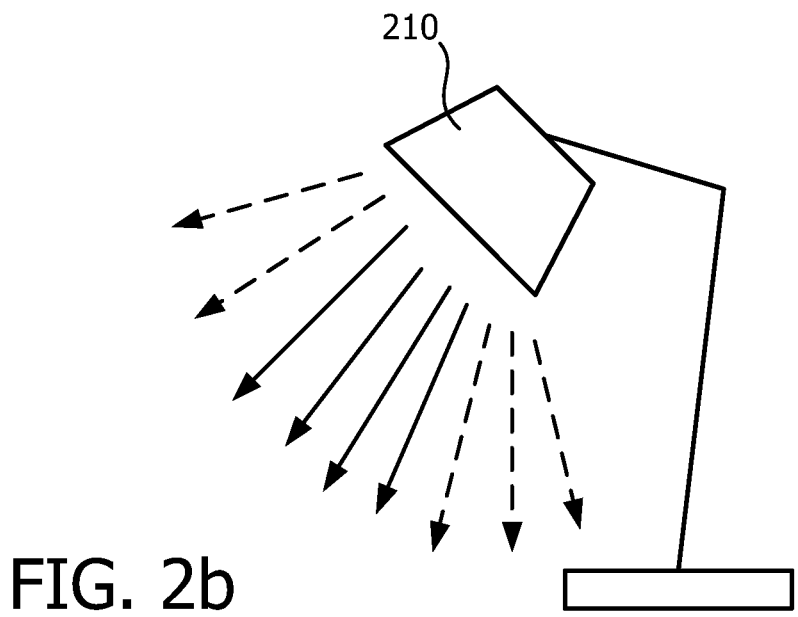

FIG. 2a and FIG. 2b depict schematic diagrams of an illumination apparatus in accordance with an embodiment of the present invention. FIG. 2a is a front view and FIG. 2b is a side view. The full lines show the light emitted by the first light source (not shown) and the dashed lines show the light emitted by the second light source (not shown).

In an embodiment of the illumination apparatus, referring to FIG. 2a and FIG. 2b, the first light source and the second light source both emit light downward. The adjusting unit (not shown) can dim or brighten the second light source and/or the first light source to change the contrast ratio from the first predefined value to the second predefined value and keep the measured illuminance of the first area unchanged. Optionally, the propagation direction of the light can be controlled by adjusting the length of the lampshade 210.

Figure 3A:
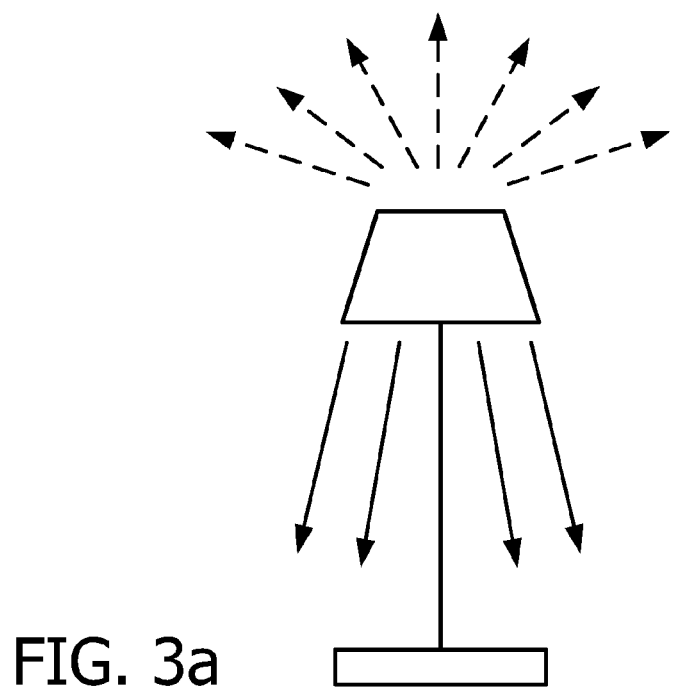
FIG. 3a and FIG. 3b depict schematic diagrams of an illumination apparatus in accordance with another embodiment of the present invention.
Figure 3B:
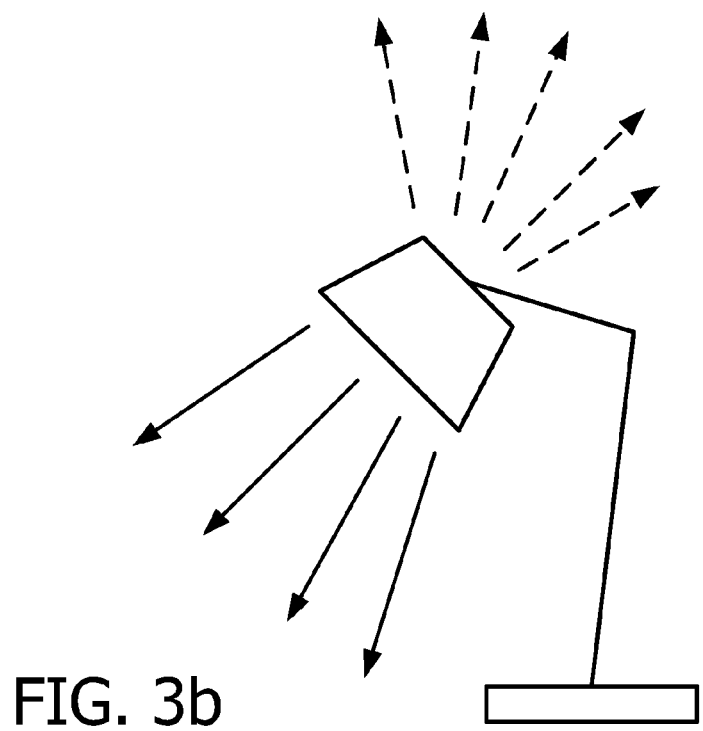

FIG. 3a and FIG. 3b depict schematic diagrams of an illumination apparatus in accordance with another embodiment of the present invention. FIG. 3a is a front view and FIG. 3b is a side view. The full lines show the light emitted by the first light source (not shown) and the dashed lines show the light emitted by the second light source (not shown).

In another embodiment of the illumination apparatus, referring to FIG. 3a and FIG. 3b, the first light source emits light downward and the second light source emits light upward. Because the second light source emits light upward, the first area illuminated by the first light source receives very little light from the second light source. Therefore, the adjusting unit (not shown) may gradually brighten the second light source to change the contrast ratio from the first predefined value to the second predefined value and keep the measured illuminance of the first area unchanged. Alternatively, the adjusting unit may gradually dim the first light source to change the contrast ratio gradually. It is also practical to adjust both light sources to make the contrast ratio change gradually.

Figure 4A:
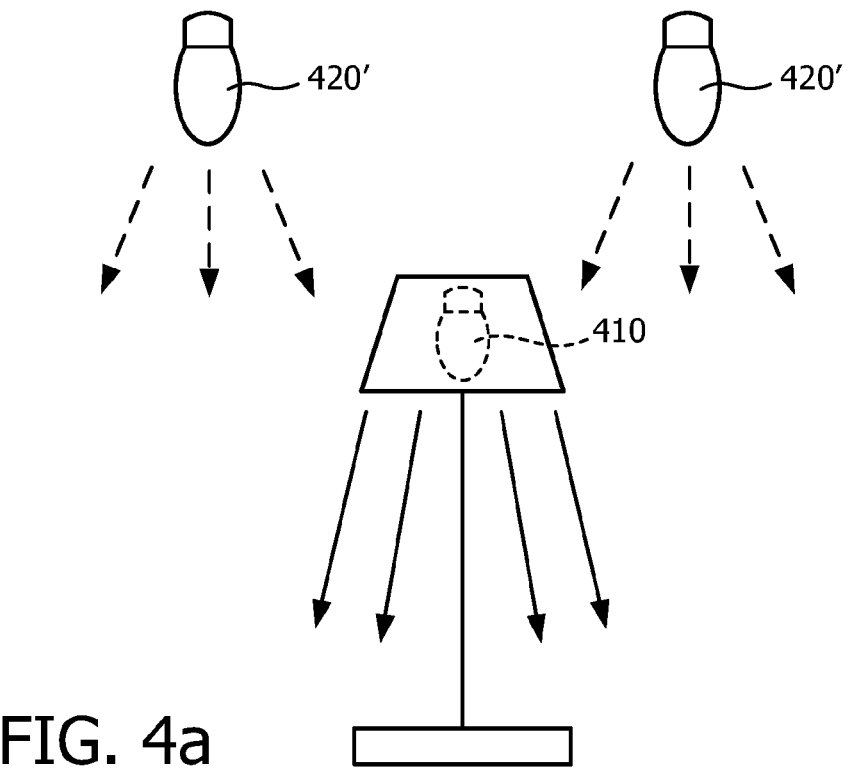
FIG. 4a and FIG. 4b depict schematic diagrams of an illumination apparatus in accordance with a further embodiment of the present invention.
Figure 4B:
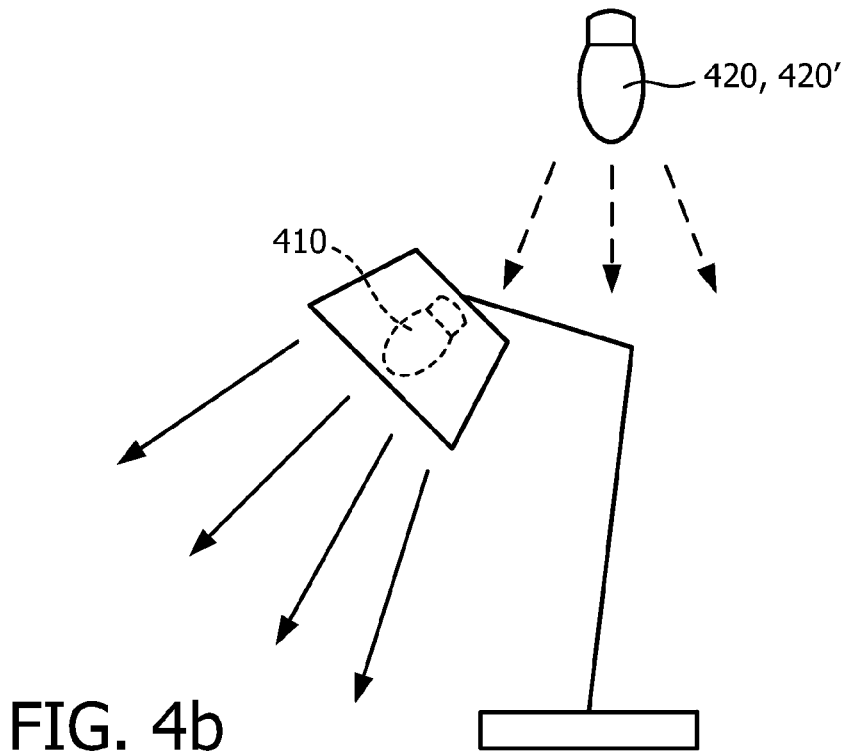

FIG. 4a and FIG. 4b depict schematic diagrams of an illumination apparatus in accordance with a further embodiment of the present invention. FIG. 4a is a front view and FIG. 4b is a side view. The full lines show the light emitted by the first light source 410 and the dashed lines show the light emitted by the second light source 420, 420'.

In a further embodiment of the illumination apparatus, referring to FIG. 3a and FIG. 3b, the second light source 420, 420' is relatively remote from the first light source 410. The adjusting unit (not shown) can send a wireless signal to adjust the first light source 410 and the second light source 420, 420' to make the contrast ratio change from the first predefined value to the second predefined value.

The contrast ratio can be changed gradually in many ways.

Figure 5:
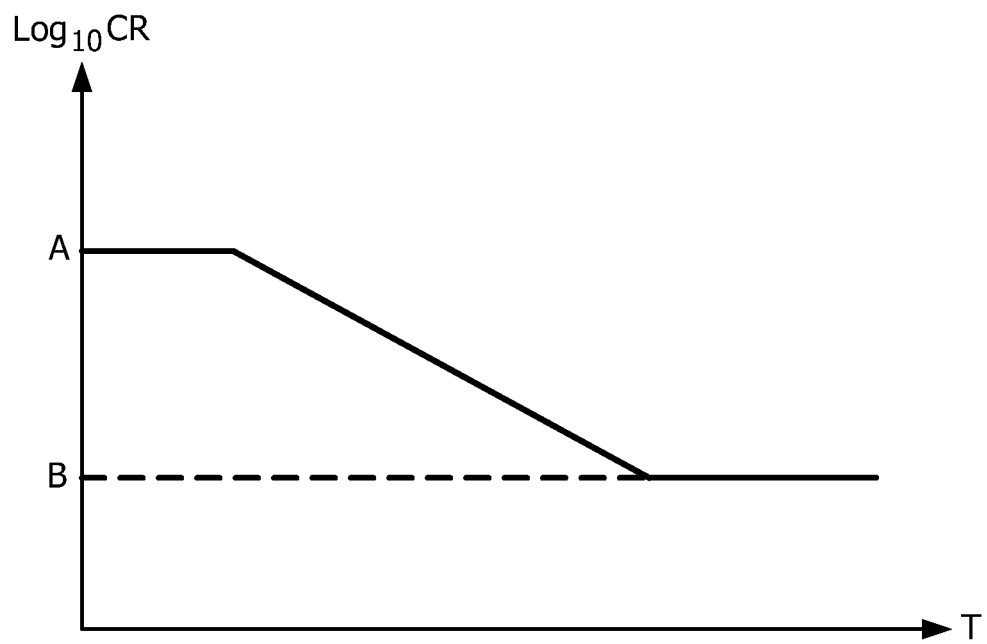
FIG. 5 depicts a schematic diagram of the change of the contrast ratio in accordance with an embodiment of the present invention.

In an embodiment, the adjusting unit is further adapted to adjust at least one of the first light source and the second light source to make the contrast ratio change linearly on a logarithmic scale from the first predefined value to the second predefined value with time during the first predefined duration. FIG. 5 depicts a schematic diagram of the change of the contrast ratio in accordance with an embodiment of the present invention. As shown in FIG. 5, the common logarithm of the contrast ratio $\log_{10} CR$ varies linearly from the common logarithm of the first predefined value A to the common logarithm of the second predefined value B with time.

Figure 6:
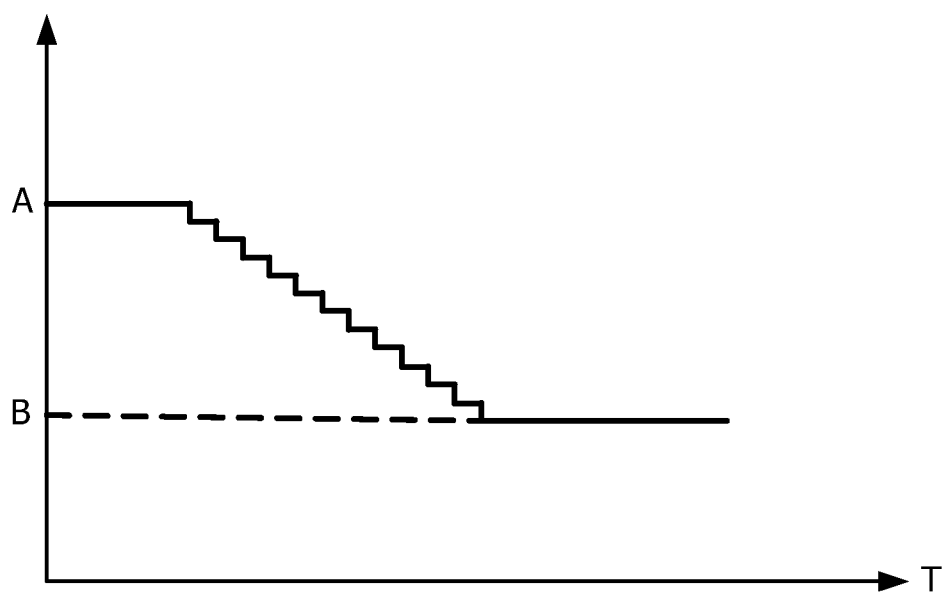
FIG. 6 depicts a schematic diagram of the change of the contrast ratio in accordance with another embodiment of the present invention.

In another embodiment, the adjusting unit is further adapted to adjust at least one of the first and the second light sources to make the contrast ratio change from the first predefined value to the second predefined in a stepwise manner. That is to say the change of the contrast ratio is a stepped change. FIG. 6 depicts a schematic diagram of the change of the contrast ratio in accordance with another embodiment of the present invention. As shown in FIG. 6, the common logarithm of the contrast ratio $\log_{10} CR$ varies with time from the common logarithm of the first predefined value A to the common logarithm of the second predefined value B in a stepwise manner.

In a further embodiment, the adjusting unit is further adapted to adjust at least one of the first light source and the second light source to make the measured illuminance change at a rate lower than a third predefined value. The measured illuminance can be the measured illuminance of the first light source and/or the measured illuminance of the second light source. The third predefined value can be 1.07 Lux per second. In this way, the users will not obviously notice the change of the measured illuminance.

In another embodiment, the adjusting unit is further adapted to adjust at least one of the first light source and the second light source to make the contrast ratio equal to the first predefined value for a second predefined duration. That is to say that the contrast ratio remains equal to the first predefined value before it changes to the second predefined value. The second predefined duration can be determined in many ways. For example, the second duration can be set as a period (e.g. 10 minutes) which is long enough to spirit the users. In this way, the users can maximally improve the work efficiency.

Figure 7:
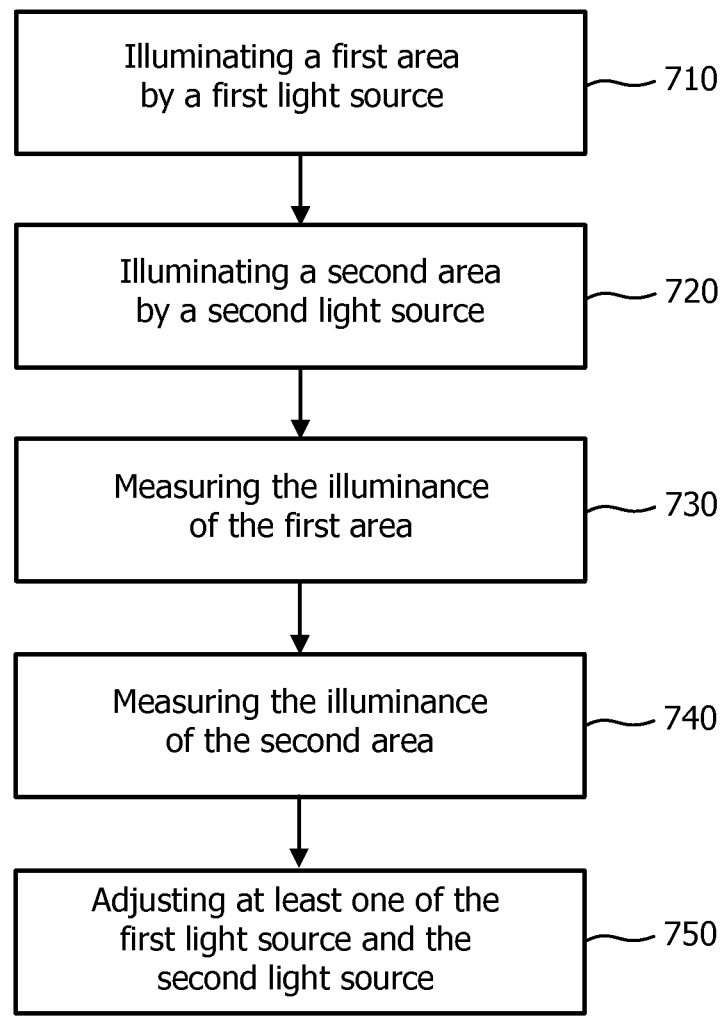
FIG. 7 depicts a flow chart of an illumination method in accordance with an embodiment of the present invention.

FIG. 7 depicts a flow chart of an illumination method.

According to an embodiment of another aspect of the present invention, a method of illuminating is provided.

Referring to FIG. 7, the method comprises step 710 of illuminating a first area by a first light source.

The method further comprises step 720 of illuminating a second area by a second light source.

The method further comprises step 730 of measuring the illuminance of the first area.

The method further comprises step 740 of measuring the illuminance of the second area.

The method further comprises step 750 of adjusting at least one of the first light source and the second light source to make the contrast ratio of the measured illuminance of the first area to the measure illuminance of the second area change gradually from a first predefined value to a second predefined value lower than the first predefined value during a first predefined duration.

In an embodiment, the method further comprises the step of adjusting at least one of the first light source and the second light source to make the contrast ratio change linearly on a logarithmic scale from the first predefined value to the second predefined value with time during the first predefined duration. Optionally, the method further comprises the step of receiving an input to define the first predefined duration.

In another embodiment, the method further comprises the step of adjusting at least one of the first and the second light sources to make the contrast ratio change from the first predefined value to the second predefined in a stepwise manner.

In a further embodiment, the method further comprises the step of adjusting at least one of the first light source and the second light source to make the measured illuminance change at a rate lower than a third predefined value.

In another embodiment, the method further comprises the step of adjusting at least one of the first light source and the second light source to make the contrast ratio equal to the first predefined value for a second predefined duration.

A set of computer-executable instructions is further proposed to perform the methods described above. The instructions can reside in the adjusting unit, and interoperate with the first and the second light sources, and with the first and the second measuring units, to perform any step of the above disclosed methods.

Although the present invention has been described with reference to the embodiments shown in the drawings, it should be understood that the present invention may be embodied in many alternative forms including any combination of hardware and software. In addition, any suitable size, shape or type of materials, elements, computer program elements, computer program code, or computer program modules could be used.

While discussed in the context of computer program code, it should be understood that the modules may be implemented in hardware circuitry, computer program code, or any combination of hardware circuitry and computer program code.

It should be noted that the above-mentioned embodiments illustrate rather than limit the invention and that those skilled in the art will be able to design alternative embodiments without departing from the scope of the appended claims. The embodiments are illustrative rather than restrictive. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the device claims enumerating several units, several of these units can be embodied by one and the same item of hardware or software. The use of the words first, second and third, et cetera, does not indicate any ordering. These words are to be interpreted as names.

The invention claimed is:

1. An illumination apparatus, comprising:
   a first light source for illuminating a first area;
   a second light source for illuminating a second area;
   a first measuring unit for measuring the illuminance of the first area;
   a second measuring unit for measuring the illuminance of the second area; and
   an adjusting unit for adjusting at least one of the first light source and the second light source to make the contrast ratio of the measured illuminance of the first area to the measured illuminance of the second area change gradually from a first predefined value to a second predefined value lower than the first predefined value during a first predefined duration.

2. An illumination apparatus as claimed in claim 1, wherein the adjusting unit is further adapted to adjust, at least one of the first light source and the second light source, to make the contrast ratio change linearly on a logarithmic scale from the first predefined value to the second predefined value.

3. An illumination apparatus as claimed in claim 1, wherein the adjusting unit is further adapted to adjust at least one of the first light source and the second light source to make the contrast ratio change in a stepwise manner.

4. An illumination apparatus as claimed in claim 1, wherein the adjusting unit is further adapted to adjust at least one of the first light source and the second light source to make the measured illuminance of the first light source and/or the second light source change at a rate lower than a third predefined value.

5. An illumination apparatus as claimed in claim 4, wherein the third predefined value is 1.07 lx/s.

6. An illumination apparatus as claimed in claim 5, wherein the adjusting unit is further adapted to adjust at least one of the first light source and the second light source to make the contrast ratio equal to the first predefined value for a second predefined duration.

7. An illumination apparatus as claimed in claim 1, wherein the first predefined value is 10:0 and the second predefined value is in a range of 10:2 to 10:4.

8. An illumination apparatus as claimed in claim 7, further comprising:
   a user interface for receiving an input to define any one of the first predefined duration, the first predefined value, and the second predefined value.

9. An illumination apparatus as claimed in claim 1, wherein the first area is a task area and the second area is a background area.

10. A method of illuminating, comprising the steps of:
    illuminating a first area by a first light source;
    illuminating a second area by a second light source;
    measuring the illuminance of the first area;
    measuring the illuminance of the second area; and
    adjusting at least one of the first light source and the second light source to make the contrast ratio of the measured illuminance of the first area to the measured illuminance of the second area change gradually from a first predefined value to a second predefined value lower than the first predefined value during a first predefined duration.

11. A method as claimed in claim 10, further comprising the step of:
    adjusting at least one of the first light source and the second light source to make the contrast ratio change linearly on a logarithmic scale from the first predefined value to the second predefined value.

12. A method as claimed in claim 10, further comprising the step of:
    adjusting at least one of the first light source and the second light source to make the contrast ratio change from the first predefined value to the second predefined value in a stepwise manner.

13. A method as claimed in claim 10, further comprising the step of:
    adjusting at least one of the first light source and the second light source to make the measured illuminance of the first light source and/or the second light source change at a rate lower than a third predefined value.

14. A method as claimed in claim 10, wherein the first predefined value is 10:0 and the second predefined value is in a range of 10:2 to 10:4.

15. A set of non-transitory computer-executable instructions, configured to perform the method of claim 10 when executed on a data-processing system.

* * * * *